United States Patent [19]
Somers
[11] 3,763,994
[45] Oct. 9, 1973

[54] PROTECTIVE STORAGE CASE FOR TAPE CASSETTES

[76] Inventor: Stanley Brice Lascelles Somers, 5, Quai du Mont-Blanc, Geneva, Switzerland

[22] Filed: Aug. 21, 1972

[21] Appl. No.: 282,113

[30] Foreign Application Priority Data

Aug. 30, 1971 Switzerland ........................ 12709/71

[52] U.S. Cl. ......... 206/1 R, 206/52 F, 206/DIG. 36, 220/31 S, 312/13

[51] Int. Cl. ........................ A45c 11/00, B65d 43/16

[58] Field of Search ................. 206/1 R, 52 R, 52 F, 206/62 D, DIG. 36; 220/31 S; 312/10, 13, 14; 87/1 D

[56] References Cited

UNITED STATES PATENTS

| | | | |
|---|---|---|---|
| D 223,739 | 5/1972 | Weiss et al. | 206/DIG. 36 |
| 3,051,537 | 8/1962 | Diehl et al. | 312/13 X |
| 3,102,635 | 9/1963 | Werwin et al. | 312/13 X |
| 3,272,325 | 9/1966 | Schoenmakers | 206/DIG. 36 |
| 3,348,668 | 10/1967 | Amatsu et al. | 206/52 F |
| 3,620,361 | 11/1971 | Fugiwara et al. | 206/1 R |
| 3,685,684 | 8/1972 | Schindler et al. | 220/31 S X |

*Primary Examiner*—Samuel E. Rothberg
*Assistant Examiner*—Steven E. Lipman
*Attorney*—Irvin S. Thompson et al.

[57] ABSTRACT

A protective storage case for tape cassettes includes a rectangular parallelepipedic box with two perpendicular open edge faces adapted to be opened or closed by a pivoting flap member including means for supporting a cassette to be stored in the box and for preventing rotation of the two hubs of the cassette. When several cases form a side-by-side collection, cassettes can be removed and inserted without removing individual cases from the collection.

2 Claims, 3 Drawing Figures

PATENTED OCT 9 1973 3,763,994

SHEET 1 OF 2

PROTECTIVE STORAGE CASE FOR TAPE CASSETTES

The invention relates to the storage of tape cassettes of the type including a tape, for example a magnetic tape, wound in an enclosure between two spools, the spools each having a hub accessible from at least one outer face of the enclosure.

Various types of cases for storing and protecting cassettes are known. Certain of these cases are formed by hollow parallelepipedic boxes adapted to receive a cassette, which boxes include a lid or cover and a facing bottom, one of the cover and bottom carrying protuberances adapted to engage in the hubs of the cassette to prevent rotation thereof. A fairly considerable labor is involved in assembling the bottom and cover of such cases and, moreover, these two parts easily tend to accidentally separate if the case is allowed to fall or is handled without care. Additionally, if the case is stored in a collection with the cases placed side-by-side, it is necessary to fully remove a case from the collection in order to remove the cassette stored therein.

Other cases include a cover or lid hingedly mounted onto the bottom, the hinge being either molded integrally with the case, or being an added piece such as a flexible rubber tape stuck to the two parts. Again, one of the two parts includes protuberances adapted to prevent rotation of the hubs of a stored cassette, but such a case also suffers the inconvenience that it must be fully removed from a collection in order to open it for removal of the cassette.

Another known type includes a case one edge of which is formed by a wall which can be pivoted to open the case and enable the cassette to be gripped and removed, without having to remove the case from a collection. However, this type has the drawback that no means are provided for preventing the rotation of the two hubs.

An object of the invention is to provide a cassette storage case which does not have the above-indicated drawbacks of known cases.

According to the invention, a protective storage case for tape cassettes with two hubs comprises a hollow generally parallelepipedic flat box dimensionned to enclose a cassette, said box having two main parallel spaced apart generally rectangular faces connected along two perpendicular edges thereof by two mutually perpendicular first walls and having open edge faces along the other two perpendicular edges thereof, a flap member including two mutually perpendicular second walls corresponding to the open edge faces of the box, said second walls being connected together by a third wall disposed parallel to the main faces of the box, said third wall having two protuberances adapted to engage with the hubs of a cassette plated thereon, and hinge means connecting the box and flap member for movement between a first position in which said second walls close the open edge faces of the box to enclose a cassette mounted on said protuberances, and a second position in which a cassette can be placed on and removed from said flap member.

An embodiment of the invention will now be described with reference to the accompanying drawings, in which.

Figure 1:
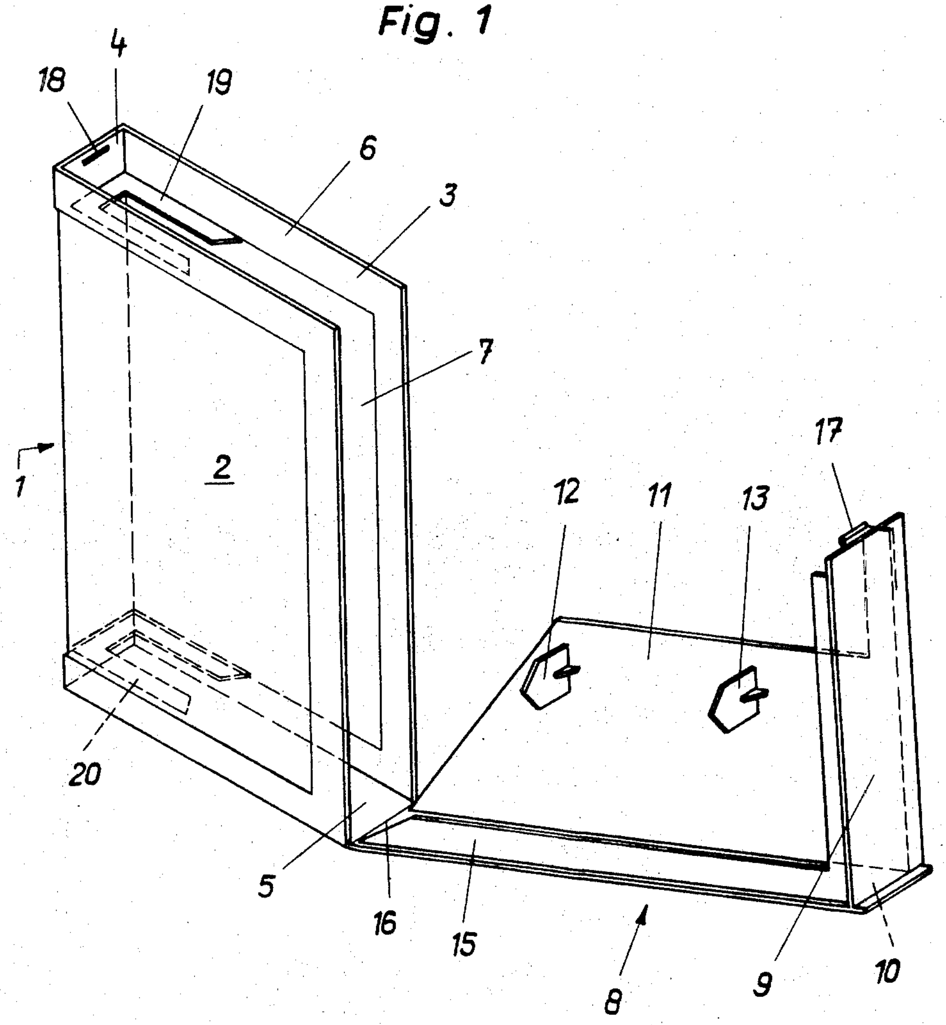
FIG. 1 is a perspective view of a tape cassette storage case shown partially opened.
Figure 2:
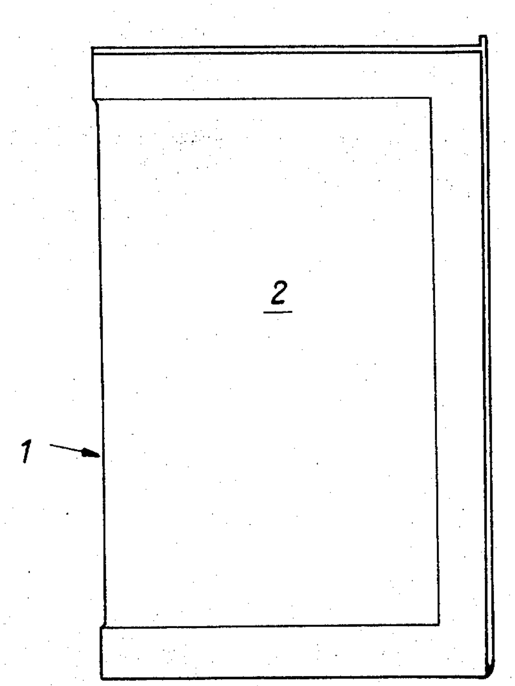
FIG. 2 is a side elevation of the closed case.
Figure 3:
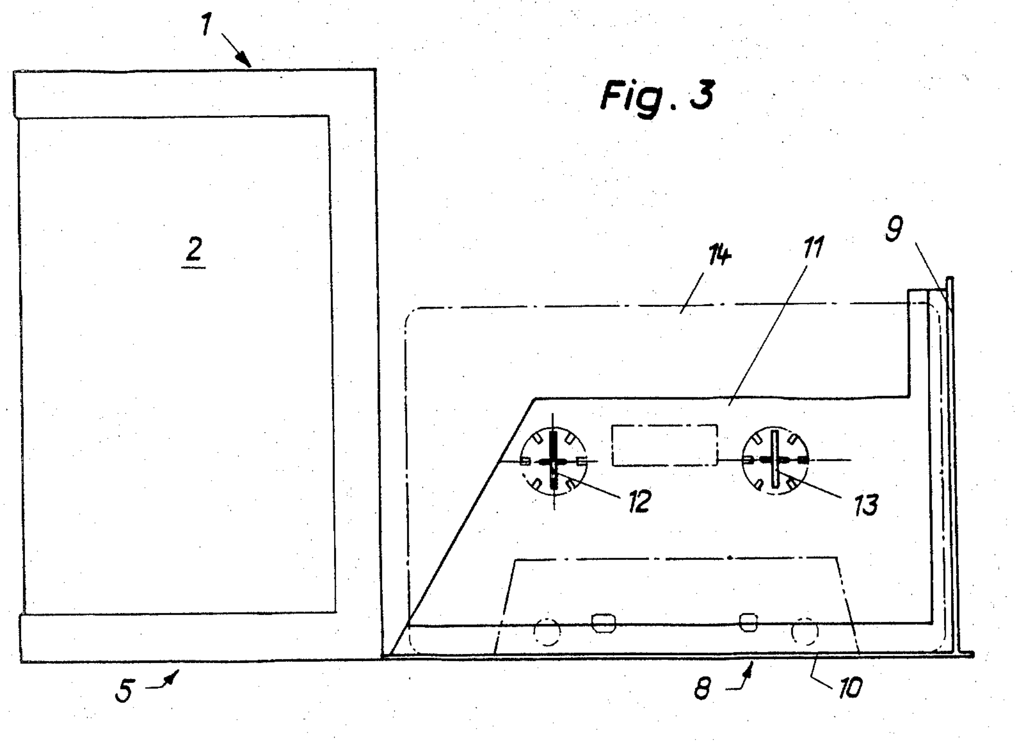
FIG. 3 is a side elevation of the fully opened case, with a schematically indicated cassette.

The case shown includes a hollow generally parallelepipedic flat box 1 dimensionned to enclose a tape cassette, said box having two main parallel spaced apart rectangular faces 2 and 3 connected along two perpendicular edges thereof by walls 4 and 5 which are mutually perpendicular and perpendicular to the planes of faces 2 and 3. The faces 2 and 3 are slightly longer than the corresponding sides of a cassette adapted to be lodged in the case, and the width of walls 4 and 5 is such that the internal spacing between faces 2 and 3 is slightly greater than the thickness of the cassette. The two other perpendicular faces 6 and 7 of the box are open. The case also has a flap member 8 including two mutually perpendicular walls 9 and 10 respectively corresponding to the open edge faces 6 and 7 of box 1, and a third wall 11 disposed parallel to the faces 2 and 3 of the box. Wall 11 carries two protuberances 12 and 13 adapted to penetrate into the hubs of a cassette 14 (FIG. 2) placed on the flap member 8. A side flange 15, opposite wall 11, is provided to reinforce flap member 8 and hold the cassette in place. A hinge 16 connects the box 1 and flap member 8 so as to allow the latter to move between a first position (FIG. 2) in which its walls 9 and 10 close the box by penetrating into the corresponding open faces 6 and 7, and a second position (FIG. 3) in which the box is open, wall 10 extending in extension of wall 5. In FIG. 1, the case is shown in an intermediary position.

The three parts forming the case, namely box 1, flap member 8 and hinge 16, are moulded in a single piece, hinge 16 being thinner than the walls of the box and flap member so as to have the required flexibility to allow pivoting of the flap member about an axis perpendicular to the plane of faces 2 and 3.

When the flap member is in its open position (FIG. 3), it is possible to mount a cassette 14 thereon by placing the cassette so that protuberances 12 and 13 penetrate into the hubs of the cassette, thereby preventing them from rotating. The face of the cassette which is open for passage of tape may be disposed downwardly against wall 10, or upwardly, according to the distance provided between wall 11 and flange 15 and the height of the protuberances 12 and 13. Flap member 8 may then be moved to its closed position (FIG. 2) with the cassette fully enclosed in the box by the flap member 8 and held in place by protuberances 12 and 13. In this position, flap member 8 penetrates into box 1, with its wall 11 disposed inside face 3. A resilient tongue 17 of member 8 is able to removably clip into a recess 18 provided in the wall 4 of the box to firmly but releasably hold the flap member in its closed position.

When it is desired to remove the cassette from the case, flap memeber 8 is tipped to its open position, and the cassette can be easily gripped and removed. After use, the cassette can be replaced on the protuberances 12 and 13, and the case closed. struts 19 and 20 in box 1 contribute to maintain the cassette in place when the flap member is closed, and to reinforce the box.

The described case has the advantage of enabling a cassette to be removed therefrom without the necessity of removing the case from a collection formed by several cases held side-by-side in a block. It also has the advantage of preventing rotation of the hubs of the cassettes, when the flap member 8 is closed, by means of the protuberances 12 and 13 which penetrate into said hubs. The case is moulded in a single piece, which eliminates the need for assembly operations and the disadvantages of a case in two parts which can separate from one another. It is hermetic, with flap member 8 penetrating into the box 1, which ensures an excellent protection of the cassette against dust and humidity. The outer faces 2, 3 and 4 of box 1 and, possibly, the outer face 9 of member 8 and the outer face 5 of box 1 may carry indications relative to the contents of the cassette. The case may be made by injection moulding a shock resistant and flexible material such as polypropylene or nylon, for example.

What is claimed is:

1. A protective storage case for tape cassettes with two hubs comprises a hollow generally parallelepipedic flat box dimensionned to enclose a cassette, said box having two main parallel spaced apart generally rectangular faces connected along two perpendicular edges thereof by two mutually perpendicular first walls and having open edge faces along the other two perpendicular edges thereof, a flap member including two mutually perpendicular second walls corresponding to the open edge faces of the box, said second walls being connected together by a third wall disposed parallel to the main faces of the box, said third wall having two protuberances adapted to engage with the hubs of a cassette placed thereon, and hinge means connecting the box and flap member for movement between a first position in which said second walls close the open edge faces of the box to enclose a cassette mounted on said protuberances, and a second position in which a cassette can be placed on and removed from said flap member.

2. Case according to claim 1, in which said box,flap member and hinge means are moulded in one piece.

* * * * *